US007752808B2

(12) United States Patent
Sardo

(10) Patent No.: US 7,752,808 B2

(45) Date of Patent: Jul. 13, 2010

(54) DEVICE FOR THERMAL NEBULISATION OF A LIQUID COMPOSITION FOR TREATING FRUITS OR VEGETABLES AND CORRESPONDING USE

(75) Inventor: Alberto Sardo, Chateaurenard (FR)

(73) Assignee: Xeda International, Saint Andiol (FR)

( * ) Notice: Subject to any disclaimer, the term of this patent is extended or adjusted under 35 U.S.C. 154(b) by 555 days.

(21) Appl. No.: 11/878,272

(22) Filed: Jul. 23, 2007

(65) Prior Publication Data

US 2008/0016766 A1 Jan. 24, 2008

(30) Foreign Application Priority Data

Jul. 24, 2006 (FR) .................................. 06 06757

(51) Int. Cl.
*A01G 13/06* (2006.01)

(52) U.S. Cl. .............. 47/57.7; 47/58.1 FV; 47/DIG. 11

(58) Field of Classification Search ..................... 47/17, 47/57.6, 57.7, 89, 58.1 FV, DIG. 11, 60, 66.6; 427/4; 426/506

See application file for complete search history.

(56) References Cited

U.S. PATENT DOCUMENTS 2,342,063 A * 2/1944 Sells et al. .................. 426/310
4,318,363 A * 3/1982 Moellman et al. ........... 118/699
4,356,934 A * 11/1982 Knake ......................... 221/96
5,567,238 A * 10/1996 Long et al. .................. 118/303
5,891,246 A * 4/1999 Lund ........................... 118/13
5,935,660 A 8/1999 Forsythe et al.
6,202,346 B1 * 3/2001 Lyons et al. ................. 47/57.6
6,564,508 B1 * 5/2003 Buchan ................... 47/58.1 R
7,635,665 B2 * 12/2009 Keim et al. ................. 504/304

FOREIGN PATENT DOCUMENTS

DE 1 769 399 6/1958
FR 2 371 969 6/1978
GB 2 318 294 4/1998
GB 2 387 797 10/2003

* cited by examiner

*Primary Examiner*—T. Nguyen
(74) *Attorney, Agent, or Firm*—Wenderoth, Lind & Ponack, L.L.P.

(57) ABSTRACT

Device (1) for thermal nebulization of a liquid composition (3) comprising:

- a container (5),
- a fan for moving the air located in a zone (18) of the container (5) above the liquid composition (3),
- a channelling housing (9) which has at least one opening (23) for introducing outside air into the device (1),
- a projection sprayer by means of centrifuging the liquid composition (3) in the form of droplets in the housing (9) in order to form in a mixing region (54) a mist (2) of the liquid composition (3),
- a conduit (45) for conveying the liquid composition towards the sprayer, and
- a device (29) for heating the air arranged upstream of the mixing region (54) of the housing (9).

Use in the treatment of fruits or vegetables.

21 Claims, 3 Drawing Sheets

FIG.3
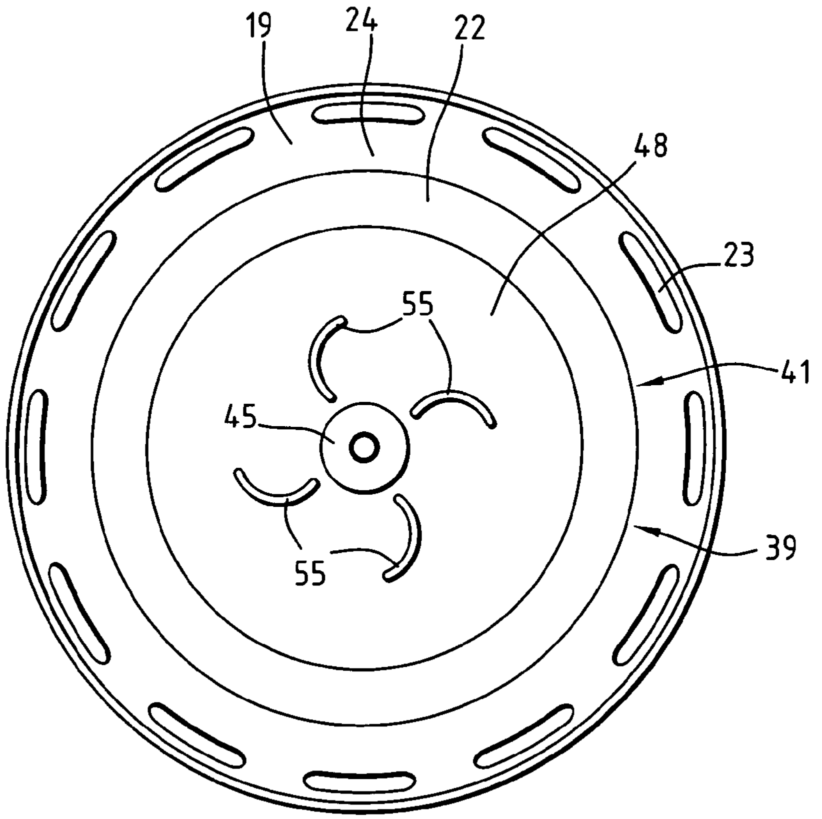
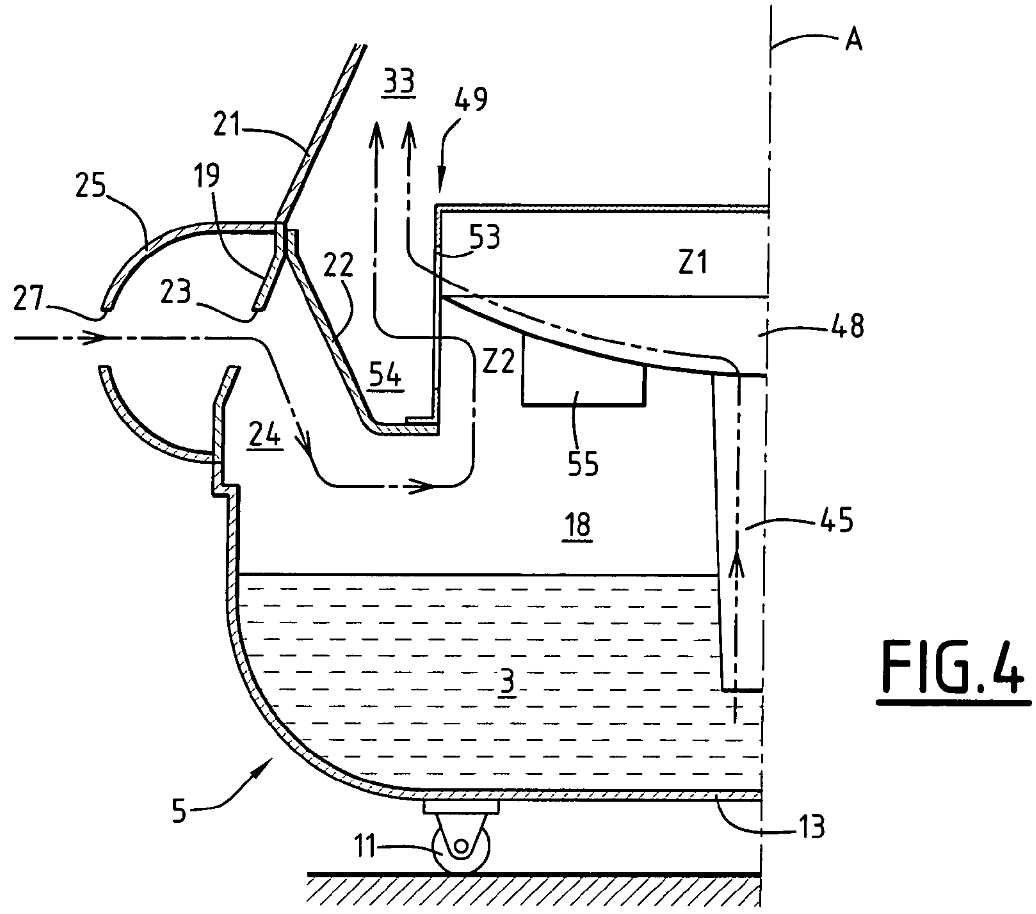
FIG.4

DEVICE FOR THERMAL NEBULISATION OF A LIQUID COMPOSITION FOR TREATING FRUITS OR VEGETABLES AND CORRESPONDING USE

TECHNICAL FIELD

The present invention relates to a device for thermal nebulisation of a liquid composition for treating fruits or vegetables.

BACKGROUND TO THE INVENTION

The invention is used, for example, for treating fruit or vegetables in a closed space, such as a storage chamber or a greenhouse.

In an application of this type, the mist formed by the device, constituted by fine droplets of the liquid composition, spreads in the space. The droplets are deposited on the fruit or vegetables, creating a fine coating layer which thus provides satisfactory treatment for the fruit or vegetables.

FR-2 566 681 describes a thermal nebulisation device which comprises an electric fan which conveys air in a first conduit which is provided at the inner side with an electrical resistor for heating the air to a temperature of between 350 and 600° C. This first conduit narrows downstream of the electrical resistor and opens in a second conduit in which the heated air reaches a speed greater than 100 m/s. A pump removes the liquid composition from a container and injects it into the second conduit so that it mixes with the air and thus forms the mist therewith.

FR-2 791 910 describes a device of the same type which is intended to produce finer droplets at the outlet of the device, so that the coating of the fruit or vegetables is more regular. More precisely, to this end, a thermal nebulisation mist is produced which has a temperature of from 200 to 280° C. with a linear speed of between 110 and 140 m/s.

The thermal nebulisation devices of these two documents are found to be satisfactory but remain relatively costly in particular owing to the presence of a pump for suction of the liquid composition.

SUMMARY OF THE INVENTION

An object of the invention is therefore to overcome this problem by providing a thermal nebulisation device for treating fruit or vegetables which is less expensive.

To this end, the invention relates to a device for thermal nebulisation of a liquid composition for treating fruit or vegetables, characterised in that it comprises:

- a container for receiving the liquid composition,
- a fan which comprises blades for moving the air located in a zone of the container above the liquid composition,
- a channelling housing which is arranged above the zone of the container, the housing having at least one opening for introducing outside air into the device and a discharge outlet, and communicating with the zone of the container in order for the fan to create a flow of air in the housing,
- a projection sprayer by means of centrifuging the liquid composition in the form of droplets in the housing in order to form, by mixing with the flow of air, in a mixing region of the housing located downstream of the fan relative to the circulation direction of the flow of air, a mist of droplets of the liquid composition,

- a conduit for sucking the liquid composition towards the sprayer under the effect of the circulation of the flow of air in the mixing region, and
- a device for heating the air arranged upstream of the mixing region of the housing.

According to specific embodiments, the device may comprise one or more of the following features, taken in isolation or according to any technically possible combination:

- the heating device is arranged upstream of the air inlet opening(s) of the housing;
- the housing converges, downstream of the mixing zone, in the direction of circulation of the flow of air;
- the housing has a substantially conical shape which is centered on an axis, the blades of the fan are intended to rotate about the axis and the suction conduit is substantially centered on the axis;
- the sprayer comprises a grid for atomising the liquid composition and a centrifuge for radially projecting the liquid composition, the centrifuge being intended to be driven in rotation about the axis;
- the centrifuge comprises a cup-like member which is in communication with the conveying conduit;
- the device comprises a common motor for driving the fan and the sprayer;
- the device comprises a chamber for heating air which is arranged around the housing and which is in communication with the or each air inlet opening, and the heating device is arranged in the heating chamber;
- the heating device is suitable for heating the air to a temperature greater than 150° C.;
- the heating device is suitable for heating the air to a temperature less than 300° C.;
- the fan is suitable for producing a flow rate of air greater than 10 $m^3$/h;
- the fan is suitable for producing a flow rate of air less than 50 $m^3$/h;
- the device is suitable for producing a mist having a temperature greater than 100° C.;
- the device is suitable for producing a mist having a temperature less than 250° C.;
- the device is suitable for producing a mist having a speed greater than 0.1 m/s;
- the device is suitable for producing a mist having a speed less than 5 m/s.

The invention also relates to the use of a device as defined above, for treating fruit or vegetables.

According to specific embodiments, the use may comprise one or more of the following features, taken in isolation or according to any technically possible combination:

- a mist is produced having a temperature greater than 100° C.;
- a mist is produced having a temperature less than 250° C.;
- a mist is produced having a speed greater than 0.1 m/s; and
- a mist is produced having a speed less than 5 m/s.

BRIEF DESCRIPTION OF THE DRAWINGS

The invention will be better understood from a reading of the following description, given purely by way of example and with reference to the appended drawings, in which:

FIG. 3 is a bottom view illustrating the sprayer and the fan of the device of FIGS. 1 and 2, and FIG. 4 is a partial schematic side sectioned view illustrating the path of the air in the device of FIG. 1.

DESCRIPTION OF PREFERRED EMBODIMENTS

Figure 1:
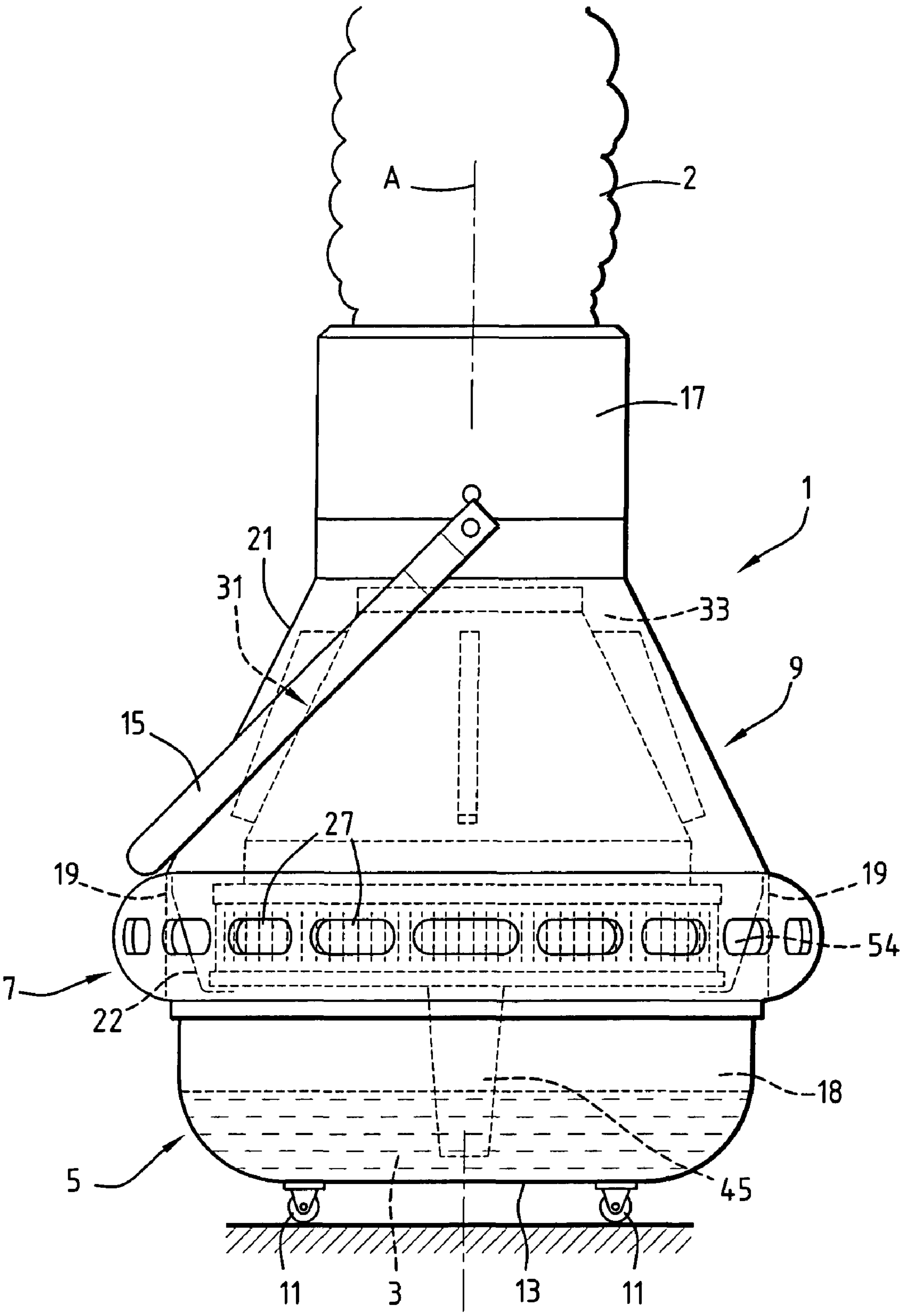
FIG. 1 is a schematic side view of a thermal nebulisation device according to the invention.

FIG. 1 illustrates a thermal nebulisation device 1 for creating a mist 2 of fine droplets of a liquid composition 3 in order to treat fruits or vegetables.

The device 1 is generally of a shape formed by means of revolution about a vertical axis A and comprises, as illustrated in FIG. 1:

a container 5 for receiving the liquid composition 3, a chamber 7 for heating a flow of air which is intended to form, by mixing with droplets of the composition 3, the mist 2, and a housing 9 for channelling the mist 2 formed.

In order to facilitate the movement thereof, the device 1 may further comprise small wheels 11, optionally provided on the base 13 of the container 5, and a handle 15 which is optionally provided at the upper end of the housing 9.

In the example which is also illustrated, the device 1 is provided with an outlet sleeve 17 for the mist 2, which sleeve 17 is arranged downstream of an outlet 20 of the housing 9.

Figure 2:
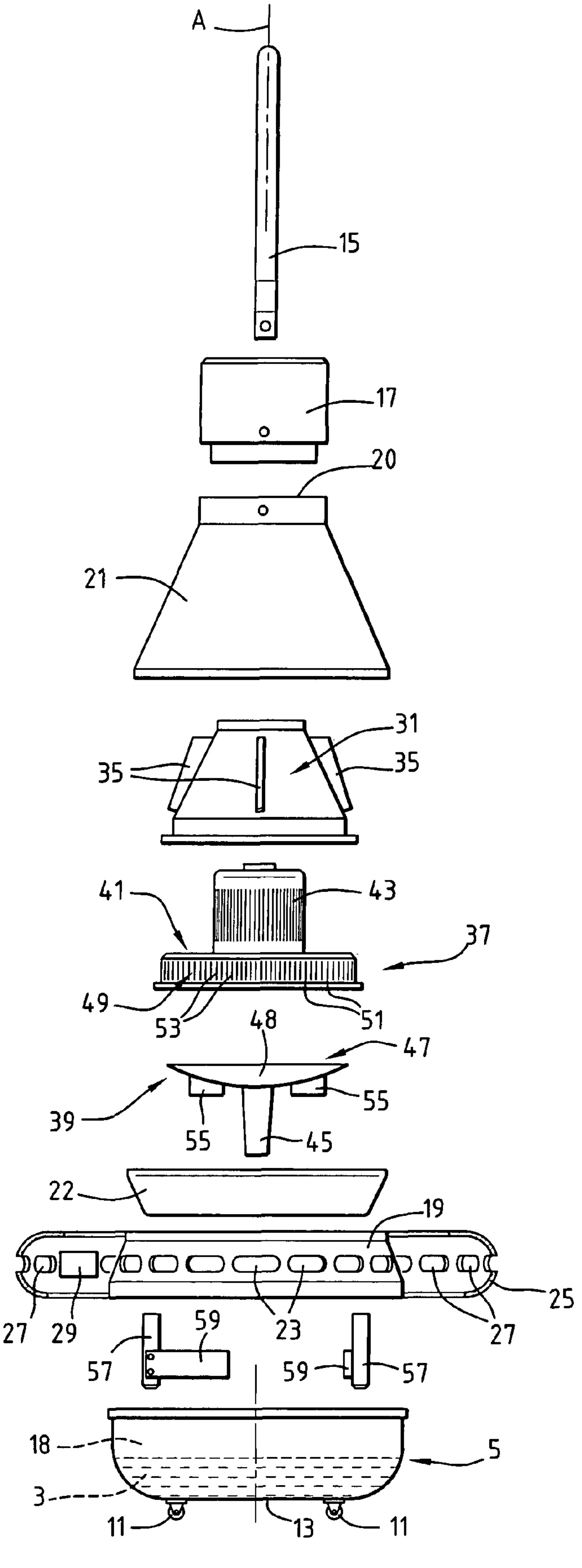
FIG. 2 is an exploded schematic side view of the device of FIG. 1.

As illustrated in FIG. 2, the container 5 is a concave vessel, generally of a shape formed by means of revolution about the axis A. It delimits a zone 18 above the liquid composition 3.

The housing 9 comprises a first upstream or lower portion 19 and a second downstream or upper portion 21.

A deflector 22 is arranged inside the first portion 19. The deflector 22 is fixed with the upper edge thereof to the upper edge of the portion 19.

The first portion 19 is perforated, in the example illustrated, by a series of air inlet openings 23.

These openings 23 are in communication with the inner side of the chamber 7 and the annular space 24 delimited between the deflector 22 and the portion 19. This space 24 communicates with the zone 18 of the container 5 (FIG. 4).

As will be described below, the first portion 19 serves to introduce the flow of air into the housing 9 and to mix the air with the liquid composition 3 in order to form the mist 2.

The walls of the heating chamber 7 are formed, on the one hand, by the first portion 19 and, on the other hand, by a cover 25 which surrounds the first portion 19. In the example illustrated, this cover 25 is substantially in the form of a part-torus centered on the axis A.

The cover 25 is perforated with air inlet openings 27 of which there are, in the example illustrated, a smaller number than the number of openings 23 provided in the first portion 19 of the housing 9.

At least one heating device 29, for example, in the form of one or more electrical resistors, is arranged inside the chamber 7. These resistors may be distributed angularly in a regular manner about the axis A.

The heating chamber 7 externally surrounds the first portion 19 of the housing 9 and therefore protrudes radially relative to the housing 9.

The second portion 21 of the housing 9 extends vertically to a height which is significantly greater than the first portion 19.

A guide 31 is arranged inside the second portion 21 in order to delimit therewith a space 33. The guide 31 has a substantially conical shape centered on the axis A and is provided with guiding fins 35 which protrude radially outwards. In the example illustrated, there are four of these fins 35 which are distributed substantially in a regular manner about the axis A.

The guide 31 is mounted on the base 13 of the container 5 by means of a fan and spray assembly 37.

The assembly 37 comprises a fan 39, a sprayer 41 and, in the example illustrated, a common motor 43 which may, still purely by way of example, be an electric motor. The assembly 37 also comprises a conduit 45 for conveying the liquid composition 3 to the sprayer 41.

The sprayer 41 comprises a centrifuge 47 and an atomisation grid 49. The grid 49 has a substantially circular contour and comprises vertical webs 51 which together delimit passages 53 for droplets of the liquid composition 3.

The grid 49 is arranged facing the first portion 19 of the housing 9 and delimits inside the deflector 22 an annular space 54 which communicates, on the one hand, with the space 33 delimited between the second portion 21 of the housing 9 and the inner guide 31 and, on the other hand, with the zone 18 of the container 5 located above the composition 3 (see FIG. 4).

The grid 49 is fixed, on the one hand, to the guide 31 and, on the other hand, to the base of the container 5. The lower edge of the grid 49 is in contact with the lower edge of the deflector 22.

The centrifuge 47 comprises a cup-like member 48 which has an upwardly directed concavity and whose base carries the conduit 45 and communicates therewith.

The conduit 45 and the cup-like member 48 are, for example, formed in one piece and are centered on the axis A. The conduit 45 has a shape which converges downwards and extends the cup-like member 48 downwards until it is introduced into the liquid composition 3.

As illustrated in FIG. 4, the cup-like member 48 is arranged in the grid 49 and has substantially the same diameter as the grid. The cup-like member 48 is arranged at an intermediate level inside the grid 49 in order to delimit with the grid 49, above the cup-like member 48, a centrifuging region Z1. In the same manner, a ventilation region Z2 is delimited below the cup-like member 48, inside the grid 49.

The cup-like member 48 is connected to the drive shaft of the motor 43 so that the motor 43 can drive it in rotation about the axis A relative to the container 5.

The fan 39 comprises blades 55 (see FIGS. 2 and 3) which are, in the example illustrated, arranged below the cup-like member 48. More precisely, they protrude downwards from the cup-like member but do not extend as far as the liquid composition 3. There are four blades 55 in the example illustrated which are distributed angularly in a substantially regular manner about the axis A. They may be, for example, integral with the cup-like member 48.

The assembly 37 is supported on the base 13 of the container 5 by means of feet 57 which carry wave-breaking blades 59 whose role is to prevent the formation of vortexes in the liquid composition 3, which could impair the suction described below. The feet 57 further fix the guide 31 and the grid 49 relative to the container 5.

The device 1 operates as follows.

The motor 43 rotationally drives the cup-like member 48 whose blades 55 move the air located in the zone Z2 and above the composition 3 in the zone 18 of the container 5.

This movement of the air has two effects:

creating an upward flow of air in the space 54 between the grid 49 and the deflector 22, and causing the liquid composition 3 to rise in the conduit 45 towards the centrifuge 47.

More precisely, and as illustrated by the dashed arrows in FIG. 4, the flow of air is sucked from outside through the openings 27, then passes through the heating chamber 7, being reheated in contact with the heating device 29, and then passes through the openings 23 provided in the first portion 19 in order to reach the space 24. The air is returned by the deflector 22 towards the zone 18 and then rises in the zone Z2 before being conveyed, through the grid 49, into the space 54 then into the space 33. Owing to the flow of air, a depression is created in the space 54, which brings about the suction of the liquid composition 3 through the conduit 45. That is to say, the liquid is caused to rise in the conduit 45 by the Venturi effect.

The liquid which has risen through the conduit 45 into the cup-like member 48 is projected radially outwards in the zone Z1 owing to the rotation about the axis A of the cup-like member 48 and is atomised on the grid 49, producing fine droplets which pass through the passages 53. These fine droplets then reach the space 54 and mix with the flow of heated air in order to form the mist 2. The path of the liquid composition 3 is indicated by double-dashed arrows.

The mist 2 then flows upwards into the space 33 delimited between the guide 31 and the second portion 21 of the housing 9. It should be noted that the convergent form of the second portion 21 allows this flow to be accelerated.

Purely by way of example, the composition 3 may have the following composition:

eugenol 20% diisobutyl ketone 25% dipropylene glycol 55%.

The heating device 29 may be, for example, suitable for heating the air to a temperature of approximately 200° C. and the fan 39 may be suitable for producing a flow rate of air of approximately 30 $m^3/h$. In this manner, when leaving the housing 9, the mist 2 may have a temperature of approximately 60° C. with a speed measured along the vertical axis A of 1 m/s.

More generally, the device 1 will preferably be adapted so that:

- the heating temperature of the air in the chamber 7 is greater than 150° C. and preferably less than 300° C., and/or
- the air flow rate produced by the fan is greater than 10 $m^3/h$ and preferably less than 50 $m^3/h$, and/or
- the vertical speed of the mist 2 when leaving the housing 9 is greater than 0.1 m/s and preferably less than 5 m/s, and/or
- the temperature of the mist 2 when leaving the housing 9 is greater than 100° C. and preferably less than 250° C.

The device 1 described above has a simple and inexpensive structure, in particular since it does not require the use of a pump.

Furthermore, it allows a good quality mist 2 to be produced and thus allows satisfactory treatment of the fruits or vegetables to be achieved.

Furthermore, since the heating device 29 is not in contact with the liquid composition 3, the risks of catching fire which could be attributed to the high temperatures reached and to the presence of inflammable compounds in the composition 3 are reduced. The device therefore operates safely.

Generally, the device 1 described above may have other variants.

In this manner, and purely by way of example, the heating device 29 may be located inside the housing 9, whilst remaining upstream of the mixing region 54 between the air and the liquid composition 3.

A heating chamber 7 is not necessarily provided to contain the heating device 29.

The numbers of openings 23 and 27 may be varied and it is even possible to provide only one opening 23 and one opening 27.

It is also possible to envisage using different motors for the fan 39 and the centrifuge 47.

In the same manner, the motor(s) may be placed at another location, for example, below the container 5.

The invention claimed is:

1. Device for thermal nebulisation of a liquid composition for treating fruit or vegetables, wherein it comprises:

- a container for receiving the liquid composition,
- a fan which comprises blades for moving the air located in a zone of the container above the liquid composition,
- a channelling housing which is arranged above the zone of the container, the housing having at least one opening for introducing outside air into the device and a discharge outlet, and communicating with the zone of the container in order for the fan to create a flow of air in the housing,
- a projection sprayer by means of centrifuging the liquid composition in the form of droplets in the housing in order to form, by mixing with the flow of air, in a mixing region of the housing located downstream of the fan relative to the circulation direction of the flow of air, a mist of droplets of the liquid composition,
- a conduit for sucking the liquid composition towards the sprayer under the effect of the circulation of the flow of air in the mixing region, and
- a device for heating the air arranged upstream of the mixing region of the housing.

2. Device according to claim 1, wherein the heating device is arranged upstream of the air inlet opening(s) of the housing.

3. Device according to claim 1, wherein the housing converges, downstream of the mixing zone, in the direction of circulation of the flow of air.

4. Device according to claim 1, wherein the housing has a substantially conical shape which is centered on an axis, the blades of the fan are intended to rotate about the axis and the suction conduit is substantially centered on the axis.

5. Device according to claim 4, wherein the sprayer comprises a grid for atomising the liquid composition and a centrifuge for radially projecting the liquid composition, the centrifuge being intended to be driven in rotation about the axis.

6. Device according to claim 5, wherein the centrifuge comprises a cup-like member which is in communication with the conveying conduit.

7. Device according to claim 4, wherein it comprises a common motor for driving the fan and the sprayer.

8. Device according to claim 1, wherein it comprises a chamber for heating air which is arranged around the housing and which is in communication with the or each air inlet opening, and the heating device is arranged in the heating chamber.

9. Device according to claim 1, wherein the heating device is suitable for heating the air to a temperature greater than 150° C.

10. Device according to claim 9, wherein the heating device is suitable for heating the air to a temperature less than 300° C.

11. Device according to claim 1, wherein the fan is suitable for producing a flow rate of air greater than 10 $m^3/h$.

12. Device according to claim 11, wherein the fan is suitable for producing a flow rate of air less than 50 $m^3/h$.

13. Device according to claim 1, wherein it is suitable for producing a mist having a temperature greater than 100° C.

14. Device according to claim 13, wherein it is suitable for producing a mist having a temperature less than 250° C.

15. Device according to claim 1, wherein it is suitable for producing a mist having a speed greater than 0.1 m/s.

16. Device according to claim 15, wherein it is suitable for producing a mist having a speed less than 5 m/s.

17. Use of a device according to claim 1 for treating fruits or vegetables.

18. Use of a device according to claim 17, wherein a mist is produced having a temperature greater than 100° C.

19. Use of a device according to claim 18, wherein a mist is produced having a temperature less than 250° C.

20. Use of a device according to claim 16, wherein a mist is produced having a speed greater than 0.1 m/s.

21. Use of a device according to claim 20, wherein a mist is produced having a speed less than 5 m/s.

* * * * *